United States Patent
Kim

(10) Patent No.: US 12,216,936 B2
(45) Date of Patent: Feb. 4, 2025

(54) STORAGE DEVICE CONTROLLING TARGET OPERATION BASED ON COLLECTED PERFORMANCE INFORMATION AND OPERATING METHOD THEREOF

(71) Applicant: SK hynix Inc., Icheon-si (KR)

(72) Inventor: Jin Woo Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 55 days.

(21) Appl. No.: 18/297,551

(22) Filed: Apr. 7, 2023

(65) Prior Publication Data

US 2024/0176541 A1  May 30, 2024

(30) Foreign Application Priority Data

Nov. 30, 2022 (KR) .................. 10-2022-0164535

(51) Int. Cl.
*G06F 3/06* (2006.01)

(52) U.S. Cl.
CPC .......... *G06F 3/0659* (2013.01); *G06F 3/0611* (2013.01); *G06F 3/064* (2013.01); *G06F 3/0673* (2013.01)

(58) Field of Classification Search
CPC ...... G06F 3/0659; G06F 3/0611; G06F 3/064; G06F 3/0673; G06F 3/0679; G06F 3/0653
See application file for complete search history.

(56) References Cited

U.S. PATENT DOCUMENTS

| | | | |
|---|---|---|---|
| 10,790,032 B2 | 9/2020 | Blodgett et al. | |
| 2017/0131948 A1* | 5/2017 | Hoang | G06F 3/0679 |
| 2018/0081543 A1* | 3/2018 | Muchherla | G06F 3/0604 |
| 2020/0043559 A1 | 2/2020 | Blodgett et al. | |
| 2022/0035547 A1* | 2/2022 | Vankamamidi | G06F 3/0673 |

FOREIGN PATENT DOCUMENTS

| | | |
|---|---|---|
| KR | 10-2014-0113212 | 9/2014 |
| KR | 10-2016-0016485 | 2/2016 |

\* cited by examiner

*Primary Examiner* — Charles Rones
*Assistant Examiner* — Hewy H Li

(57) ABSTRACT

A storage device may store performance information of the storage device in a target memory area including one or more of a plurality of memory blocks on determination that a set target condition is satisfied. And the storage device may control a target operation based on the stored performance information.

18 Claims, 13 Drawing Sheets

PER_INFO:
C = (size of invalid data in memory)

STORAGE DEVICE CONTROLLING TARGET OPERATION BASED ON COLLECTED PERFORMANCE INFORMATION AND OPERATING METHOD THEREOF

CROSS-REFERENCES TO RELATED APPLICATION

The present application claims priority under 35 U.S.C. § 119(a) to Korean patent application number 10-2022-0164535 filed in the Korean Intellectual Property Office on Nov. 30, 2022, which is incorporated herein by reference in its entirety.

BACKGROUND

1. Technical Field

Various embodiments generally relate to a storage device controlling target operations based on collected performance information and methods of operating the device.

2. Related Art

A storage device is a device that stores data according to a request from an external device such as a computer, a mobile terminal like a smartphone and a tablet, or various other electronic devices.

The storage device may include a controller for controlling a memory (e.g., a volatile memory or a nonvolatile memory) included in the storage device. The controller may receive a command from the external device, and may execute or control an operation for reading, writing or erasing data with respect to the memory, consistent with the received command.

Meanwhile, as the requirement level for performance of the storage device increases, there is an increasing need to evaluate whether the performance of the storage device satisfies requirement levels and to control the operation of the storage device based on the evaluated result.

SUMMARY

Various embodiments are directed to a storage device capable of analyzing the cause of degradation in the performance of the storage device using stored performance information and optimizing the performance of the storage device.

In an embodiment, a storage device may include: i) a memory including a plurality of memory blocks; and ii) a controller configured to store performance information of the storage device in a target memory area including one or more of the plurality of memory blocks on determination that a set target condition is satisfied, and control a target operation based on the stored performance information.

In an embodiment, a method for operating a storage device may include: i) determining whether a set target condition is satisfied, ii) measuring performance information of the storage device on determination that the target condition is satisfied, iii) storing the performance information in a target memory area including one or more of a plurality of memory blocks in a memory, and iv) controlling a target operation based on the stored performance information.

According to the embodiments of the disclosed technology, it is possible to analyze the cause of degradation in the performance of the storage device using stored performance information and optimize the performance of the storage device.

DETAIL DESCRIPTION OF THE EXEMPLARY EMBODIMENTS

Figure 1:
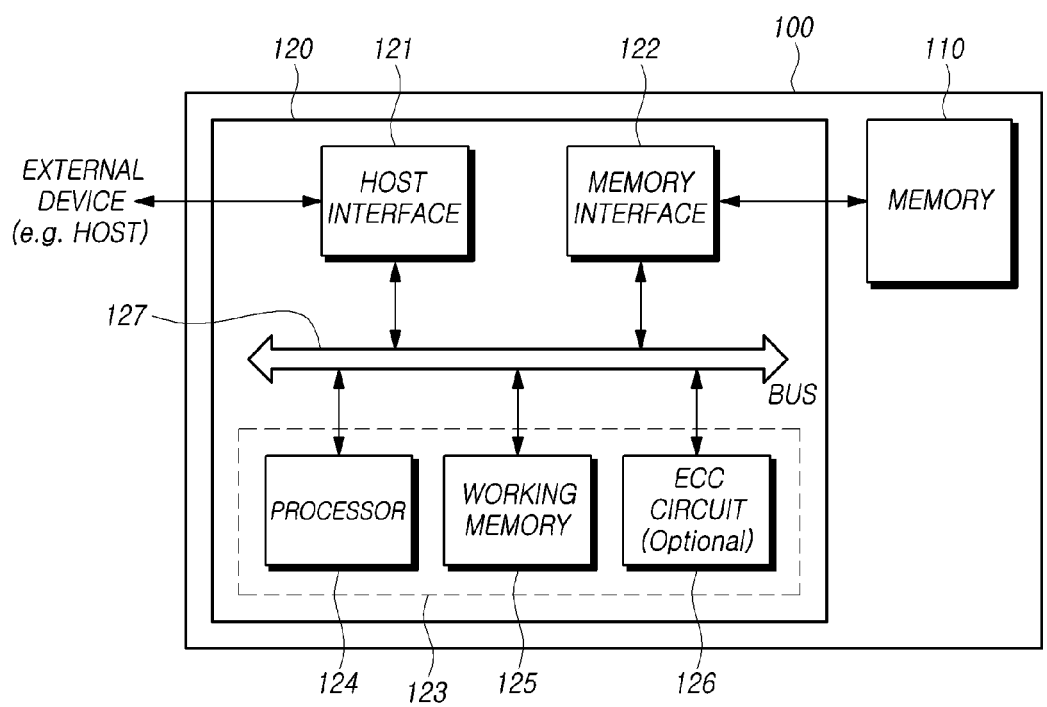
FIG. 1 is a schematic configuration diagram of a storage device according to an embodiment of the disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device according to an embodiment of the disclosure.

Referring to FIG. 1, a storage device 100 may include a memory 110 that stores data and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data. Such a memory cell array may exist in a memory block.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, also may control the operation of the memory 110 regardless or in the absence of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples.

The host may include at least one operating system (OS). The operating system may generally manage and control the function and operation of the host, and may provide interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience in explanation, descriptions will describe the controller 120 and the host as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one from among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA), by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of the disclosure will be described as implementing a processor 124 that executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer (FTL), which performs a translating function between a logical address requested to the storage device 100 from the host and a physical address of the memory 110; a host interface layer (HIL), which serves to analyze a command requested to the storage device 100 as a storage device from the host and transfer the command to the flash translation layer (FTL); and a flash interface layer (FIL), which transfers a command, instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, as data for managing the memory 110, may include for example management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, at least one from among an SRAM (static RAM), a DRAM (dynamic RAM) and an SDRAM (synchronous DRAM).

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate (BER) is higher than a reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in read data last. There may be one or more sectors that are determined to be uncorrectable. The error detection and correction circuit 126 may transfer information (e.g., address information) regarding a sector which is determined to be uncorrectable to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
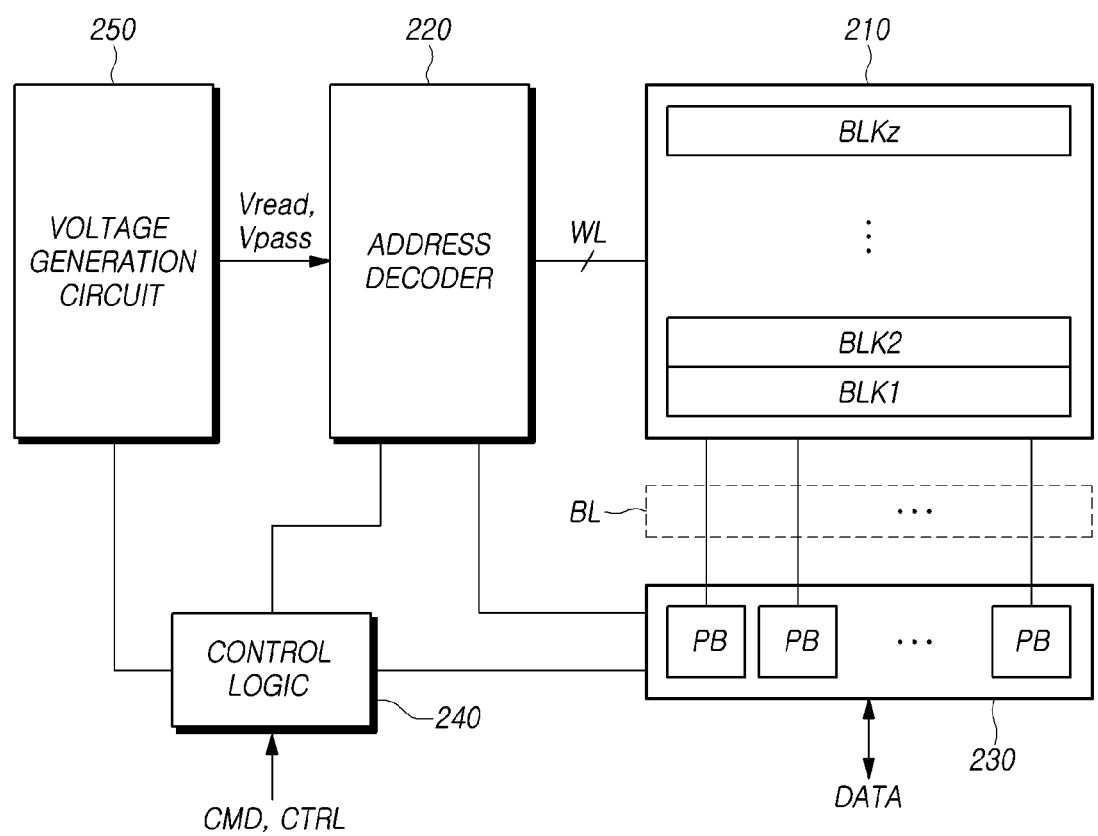
FIG. 2 is a block diagram schematically illustrating a memory of FIG. 1.

FIG. 2 is a block diagram schematically illustrating a memory of FIG. 1.

Referring to FIG. 2, a memory 110 according to an embodiment of the disclosure may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a signal level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address and a column address.

The address decoder 220 may select one memory block and one word line depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an exemplary embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell (MC) may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
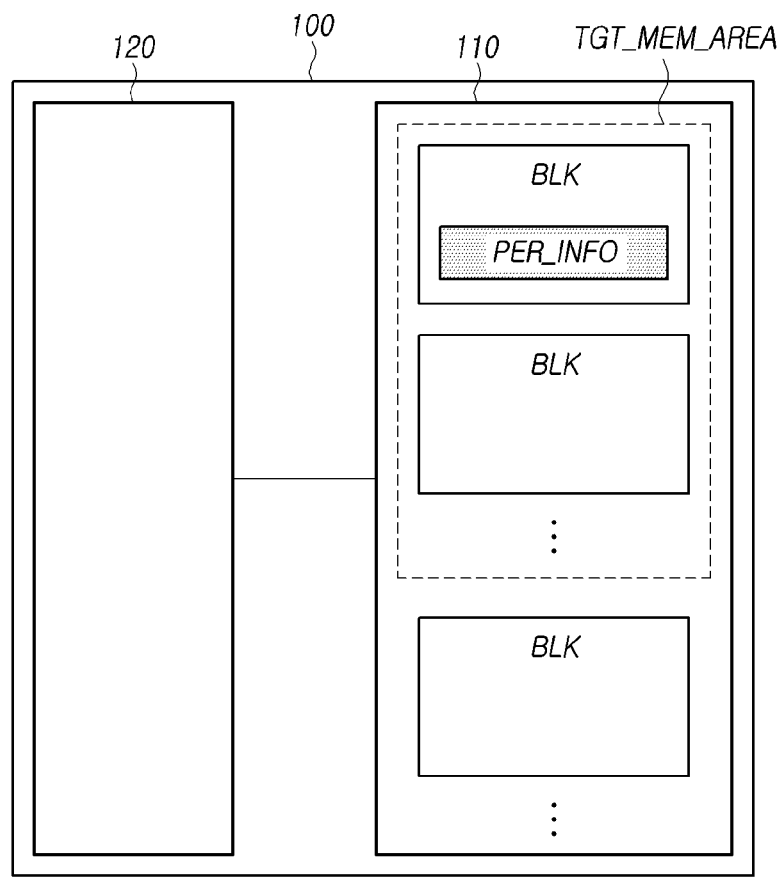
FIG. 3 is a diagram illustrating a structure of a storage device according to an embodiment of the disclosure.

FIG. 3 is a diagram illustrating a structure of a storage device according to an embodiment of the disclosure.

Referring to FIG. 3, a storage device 100 may include a memory 110 and a controller 120.

The memory 110 may include a plurality of memory blocks BLK.

The controller 120 may store performance information PER_INFO of the storage device 100 in a target memory area TGT_MEM_AREA including one or more of the plurality of memory blocks BLK when it is determined that a set target condition is satisfied.

For example, the target memory area TGT_MEM_AREA may include a dedicated memory block allocated to store the performance information PER_INFO of the storage device 100.

As another example, the target memory area TGT_MEM_AREA may include a memory block storing meta data. The performance information PER_INFO of the storage device 100 may be stored together with meta data.

The performance information PER_INFO of the storage device 100 may include indicators related to performance of operations (e.g. read, write or erase operation, background operation) executed by the storage device 100 (e.g. size of data processed by the operations, size of free space generated by the operations).

Meanwhile, the performance information PER_INFO stored in the target memory area TGT_MEM_AREA may be utilized in various way.

For example, when the controller 120 receives a command requesting performance information from the outside of the storage device 100 (e.g. HOST), the controller 120 may transmit the performance information PER_INFO stored in the target memory area TGT_MEM_AREA in response to the command.

A client or engineer who wants to analyze the storage device 100 may analyze and evaluate the performance information PER_INFO transmitted to the outside of the storage device 100 to determine performance of the storage device 100, and may take measures to correct a problem when the problem occurs in the storage device 100.

As another example, the controller 120 may control a target operation based on the performance information PER_INFO stored in the target memory area TGT_MEM_AREA. The controller 120 may adjust one or more parameters of the target operation to control the target operation.

Figure 4:
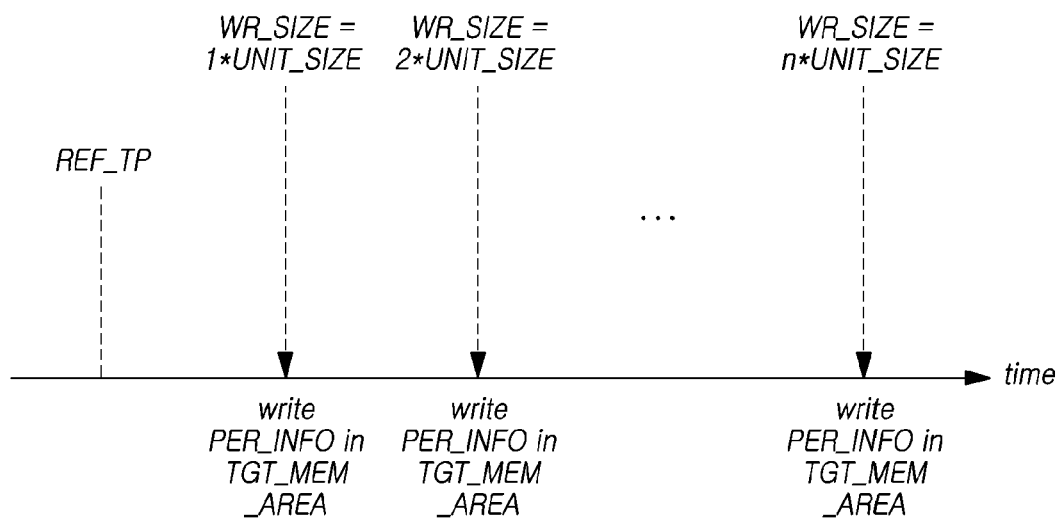
FIG. 4 is a diagram illustrating an example of a target condition for a storage device to store performance information in a target memory area according to an embodiment of the disclosure.

FIG. 4 is a diagram illustrating an example of a target condition for a storage device to store performance information in a target memory area according to an embodiment of the disclosure.

Referring to FIG. 4, a target condition may be satisfied when a cumulative size WR_SIZE of write-requested data from the outside of the storage device 100 (e.g. HOST), after a set reference time point REF_TP, is a multiple of a unit size UNIT_SIZE.

Therefore, when the cumulative size WR_SIZE becomes a multiple of the unit size UNIT_SIZE (e.g. 1*UNIT_SIZE, 2*UNIT_SIZE, ~, n*UNIT_SIZE), the controller 120 of the storage device 100 may store a performance information PER_INFO in a target memory area TGT_MEM_AREA.

Therefore, as the amount of write-requested data from the outside of the storage device 100 increases, the performance information PER_INFO may be accumulated and stored in the target memory area TGT_MEM_AREA.

Hereinafter, embodiments of the performance information PER_INFO of the storage device 100 and an operation of the storage device 100 according to the performance information PER_INFO will be described.

Figure 5:
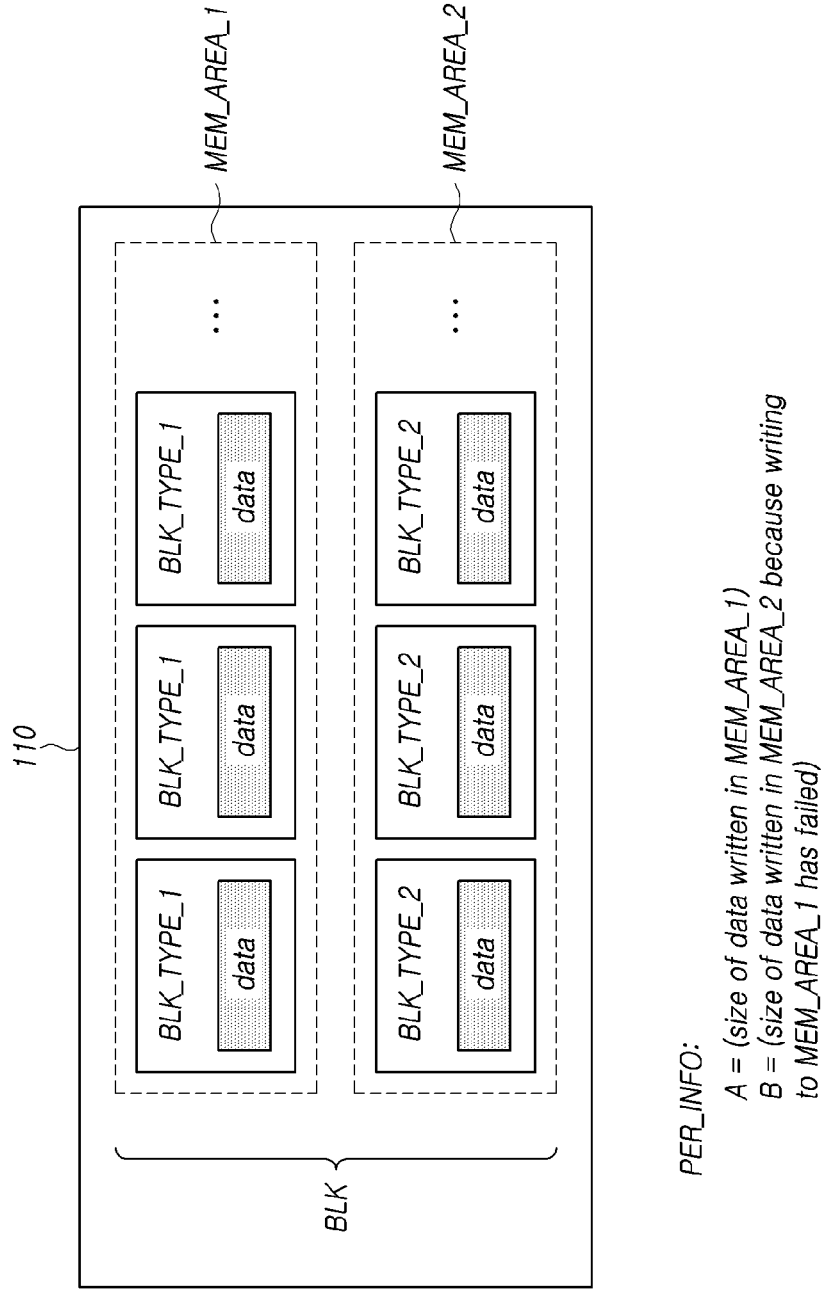
FIG. 5 is a diagram illustrating an example of performance information of a storage device according to an embodiment of the disclosure.

FIG. 5 is a diagram illustrating an example of performance information of a storage device according to an embodiment of the disclosure.

Referring to FIG. 5, a performance information PER_INFO may include 1) size A of data written, during a set reference time period, in a first memory area MEM_AREA_1, and 2) size B of data written, due to a failure to write to the first memory area MEM_AREA_1 during the reference time period, in a second memory area MEM_AREA_2.

The first memory area MEM_AREA_1 may include one or more first type memory blocks BLK_TYPE_1 from among the plurality of memory blocks BLK. The second memory area MEM_AREA_2 may include one or more second type memory blocks BLK_TYPE_2 from among the plurality of memory blocks BLK.

The first type memory blocks BLK_TYPE_1 may operate at a higher speed than the second type memory blocks BLK_TYPE_2. For example, the first type memory blocks BLK_TYPE_1 may be SLC memory blocks, and the second type memory blocks BLK_TYPE_2 may be MLC, TLC, or QLC memory blocks.

The controller 120 of the storage device 100 may store data in the first memory area MEM_AREA_1 including first type memory blocks BLK_TYPE_1 that operate at high speed in order to write data requested from the outside of the storage device 100 to the memory 110 faster.

However, when writing data to the first memory area MEM_AREA_1 fails due to insufficient free space in the first memory area MEM_AREA_1, the controller 120 of the storage device 100 may store the data in the second memory area MEM_AREA_2 instead.

The fact that write-requested data from the outside of the storage device 100 is stored in the second memory area MEM_AREA_2 instead of the first memory area MEM_AREA_1 means that write performance of the data is degraded because the first type memory block BLK_TYPE_1 operates at a higher speed than the second type memory block BLK_TYPE_2.

Therefore, the controller 120 of the storage device 100 may determine whether performance of writing data requested from the outside to the memory 110 is degraded by comparing the size A of data written in the first memory area MEM_AREA_1 and the size B of data written in the second memory area MEM_AREA_2.

For example, the controller 120 may control the target operation based on the size A and the size B when the target operation is an operation of storing write-requested data from the outside of the storage device 100 in the memory 110. Hereinafter, this will be described in more detail in FIG. 6.

Figure 6:
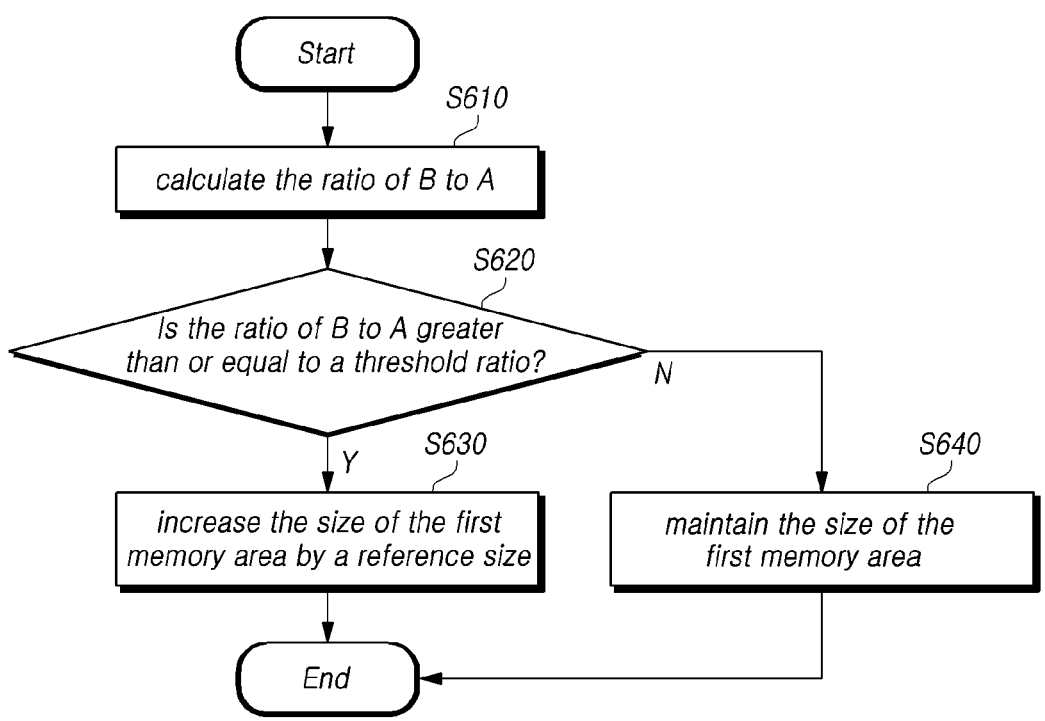
FIG. 6 is a flowchart illustrating an operation of a storage device according to performance information described in FIG. 5 according to an embodiment of the disclosure.

FIG. 6 is a flowchart illustrating an operation of a storage device 100 according to performance information described in FIG. 5 according to an embodiment of the disclosure.

Referring to FIG. 6, a controller 120 of a storage device 100 may calculate a ratio of B to A described in FIG. 5 (S610). For example, when data size A is 1 GB and data size B is 0.5 GB, the ratio of B to A is (0.5/1)=50%.

The controller 120 may determine whether the ratio of B to A is greater than or equal to a threshold ratio (S620).

The threshold ratio may be determined in various ways.

For example, the threshold ratio may be a predetermined value.

As another example, the threshold ratio may be determined based on the number of second type memory blocks BLK_TYPE_2, compared to the number of first type memory blocks BLK_TYPE_1, among the plurality of memory blocks BLK.

As another example, the threshold ratio may be determined as ratio of the size of data, written to the second memory area MEM_AREA_2 due to writing failure to the first memory area MEM_AREA_1, to the size of data written to the first memory area MEM_AREA_1 during a specific time period prior to the reference time period.

When the ratio of B to A is greater than or equal to the threshold ratio (S620—Y), the controller 120 may increase the size of the first memory area MEM_AREA_1 by a set reference size (e.g. 2 GB) (S630).

If the ratio of B to A is greater than or equal to the threshold ratio, then the ratio of data written to the second memory area MEM_AREA_2 instead of the first memory area MEM_AREA_1 due to insufficient free space in the first memory area MEM_AREA_1 is large.

Accordingly, the controller 120 may increase the size of the first memory area MEM_AREA_1 so that more data requested to be written from the outside of the storage device 100 may be written in the first memory area MEM_AREA_1 instead of second memory area MEM_AREA_2.

On the other hand, when the ratio of B to A is less than the threshold ratio (S620—N), the controller 120 may maintain the size of the first memory area MEM_AREA_1 (S640).

After the operation S630, the controller 120 may decrease the size of the first memory area MEM_AREA_1 by the reference size after all data stored in the first memory area MEM_AREA_1 is flushed to the second type memory blocks BLK_TYPE_2. That is, the controller 120 may restore the size of the first memory area MEM_AREA_1.

Figure 7:
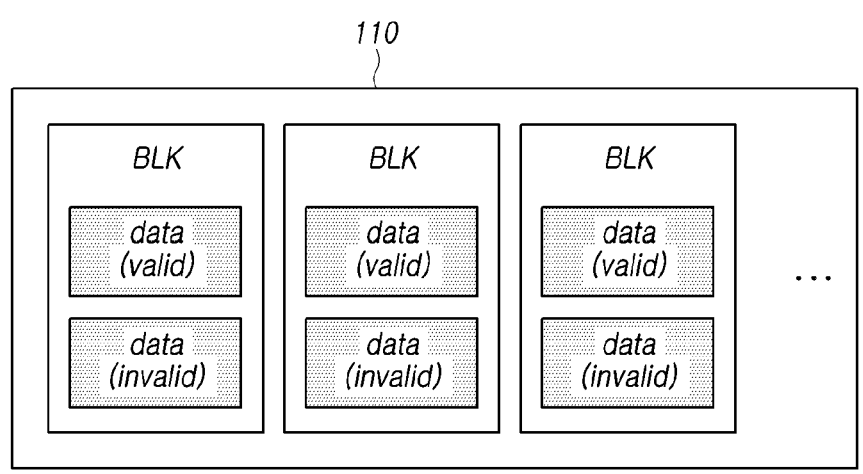
FIG. 7 is a diagram illustrating another example of performance information of a storage device according to an embodiment of the disclosure.

FIG. 7 is a diagram illustrating another example of performance information of a storage device according to an embodiment of the disclosure.

Referring to FIG. 7, performance information PER_INFO may include a total size C of invalid data stored in a memory 110 at the time when the size of the free space included in the memory 110 is changed. Invalid data is not referenced by the outside of a storage device 100 (e.g., by the HOST).

When data stored in the memory 110 is updated or a background operation is executed, the size of the free space included in the memory 110 may be changed. At this time, a controller 120 of the storage device 100 may determine the total size C of invalid data stored in the memory 110.

The controller 120 may perform a garbage collection operation to change a space in which invalid data is stored in the memory 110 to a free space.

In embodiments of the present disclosure, the controller 120 of the storage device 100 may control execution of garbage collection based on the total size C of invalid data when the target operation is a garbage collection operation.

Figure 8:
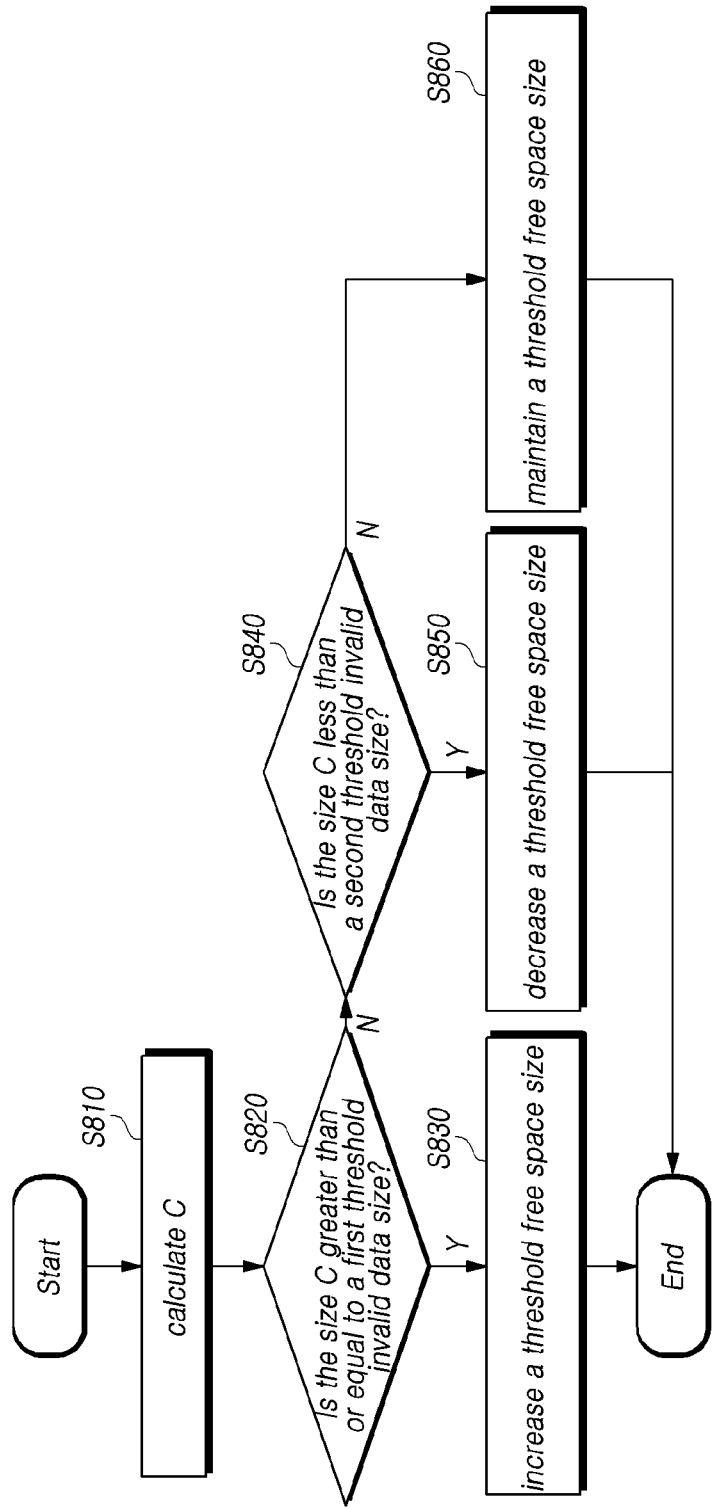
FIG. 8 is a flowchart illustrating an operation of a storage device according to performance information described in FIG. 7 according to an embodiment of the disclosure.

FIG. 8 is a flowchart illustrating an operation of a storage device according to performance information described in FIG. 7 according to an embodiment of the disclosure.

Referring to FIG. 8, a controller 120 of a storage device 100 may calculate or determine invalid data size C described in FIG. 7 (S810).

Then, the controller 120 determines whether the size C is greater than or equal to a first threshold invalid data size (S820).

When the size C is greater than or equal to the first threshold invalid data size (S820—Y), the controller 120 may increase a threshold free space size (S830).

The threshold free space size is a value that is a criterion for determining whether or not the controller 120 executes a garbage collection operation. The controller 120 may execute a garbage collection operation when the size of the free space included in the memory 110 is less than the threshold free space size.

Therefore, when the controller 120 increases the size of the threshold free space size, it means that the timing at which the controller 120 executes a garbage collection operation becomes faster and not delayed. That is, the controller 120 may perform a garbage collection operation more quickly at step S830 in order to change a space in which invalid data is stored to a free space faster.

On the other hand, when the size C is less than the first threshold invalid data size (S820—N), the controller 120 may determine whether the size C is less than a second threshold invalid data size (S840). Here, the first threshold invalid data size is greater than the second threshold invalid data size.

When the size C is less than the second threshold invalid data size (S840—Y), the controller 120 may decrease the threshold free space size (S850).

When the controller 120 decreases the size of the threshold free space size, it means that the timing at which the controller 120 executes a garbage collection operation is delayed. That is, since the size of the free space included in the memory 110 is sufficient, at step S850, the controller 120 may execute a garbage collection operation later (compared to step S830) in order to prevent an operation of processing a command received from the outside from being delayed due to the garbage collection operation.

At (S840—N), when the size C is greater than or equal to the second threshold invalid data size, the controller 120 may maintain the threshold free space size (S860).

Figure 9:
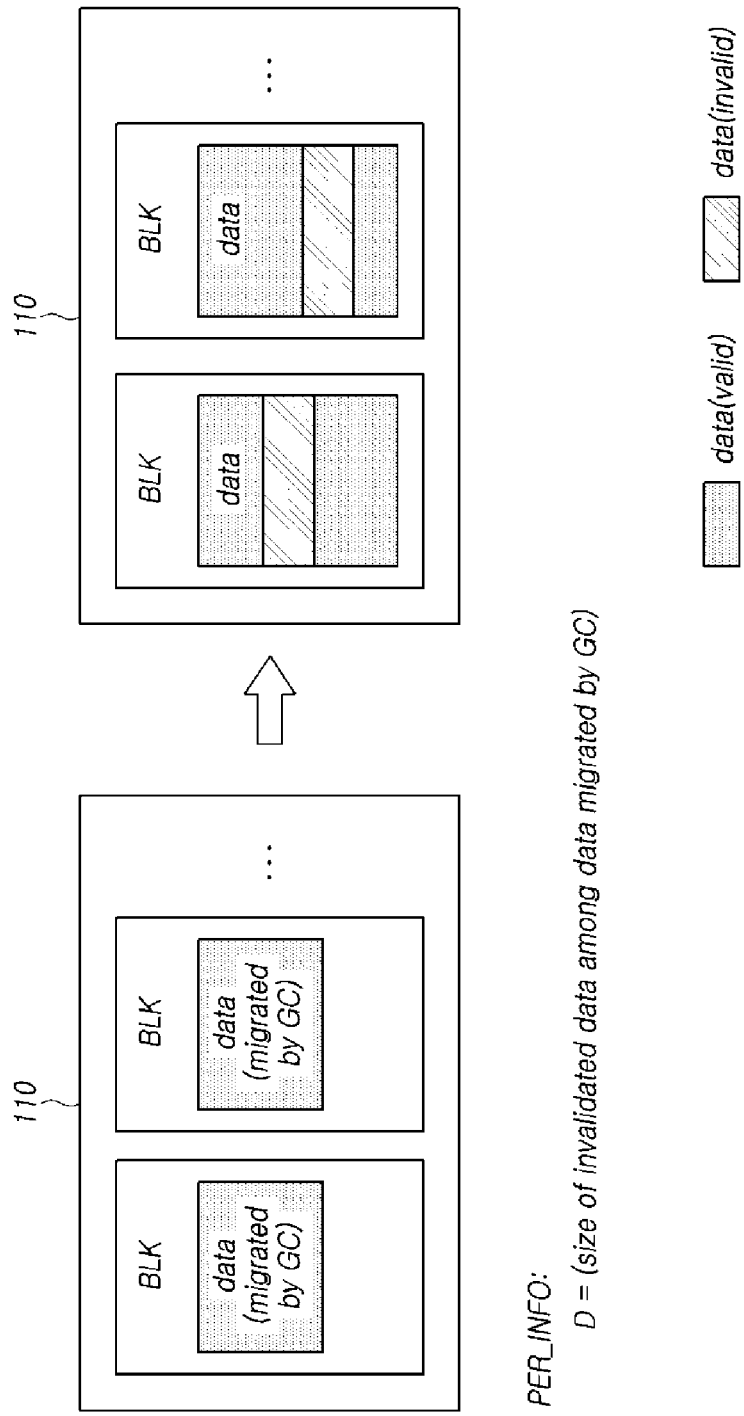
FIG. 9 is a diagram illustrating another example of performance information of a storage device according to an embodiment of the disclosure.

FIG. 9 is a diagram illustrating another example of performance information of a storage device according to an embodiment of the disclosure.

Referring to FIG. 9, a performance information PER_INFO may include a size D of invalidated data, from among data migrated by garbage collection operation, during a set reference time period.

When a garbage collection operation is executed, valid data stored in a victim memory block is migrated to another memory block. The efficiency of the garbage collection operation increases when the migrated data is cold data, that is, data that is updated less frequently.

However, when the data to be migrated is hot data, that is, data that is frequently updated, the hot data is highly likely to be invalidated again. Accordingly, because the garbage collection operation may need be performed again, the efficiency of the garbage collection operation is lowered.

When the invalidated data size D is large, data written to another memory block due to a garbage collection operation may be hot data, and thus the proportion of invalidation again is high.

In embodiments of the present disclosure, a controller 120 of a storage device 100 may control a wear leveling operation based on the size D when the target operation is the wear leveling operation.

Figure 10:
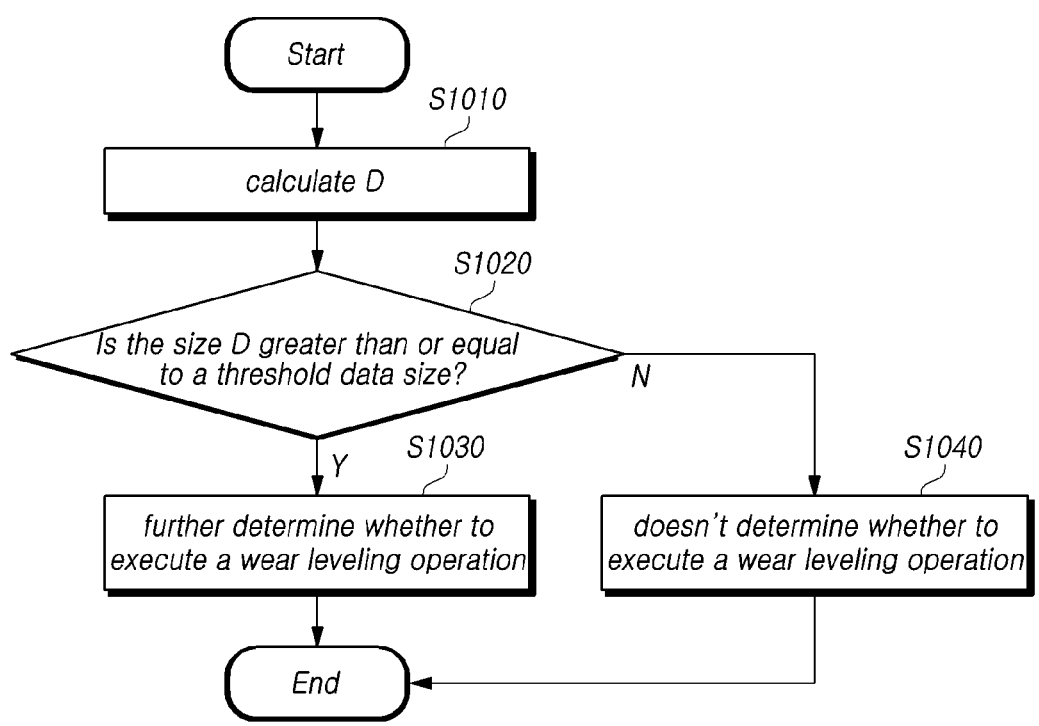
FIG. 10 is a flowchart illustrating an operation of a storage device in connection with performance information described in FIG. 9 according to an embodiment of the disclosure.

FIG. 10 is a flowchart illustrating an operation of a storage device in connection with performance information described in FIG. 9 according to an embodiment of the disclosure.

Referring to FIG. 10, a controller 120 of a storage device 100 may calculate an invalidated data size D described in FIG. 9 (S1010).

The controller 120 determines whether the size D is greater than or equal to a threshold data size (S1020).

When the size D is equal to or greater than the threshold data size (S1020—Y), the controller 120 may further determine whether to execute a wear leveling operation (S1030).

That is, in addition to executing the wear leveling operation according to a preset condition, the controller 120 may further determine whether to execute the wear leveling operation when the size D is equal to or greater than the threshold data size. While determining whether to execute the wear leveling operation, the controller 120 may execute wear leveling when the execution condition of the wear leveling operation (e.g., the execution condition may be determined based on at least one of the average erase count, the minimum erase count, and the maximum erase count of the plurality of memory blocks BLK) is satisfied.

On the other hand, when the size D is less than the threshold data size (S1020—N), the controller 120 may not determine whether to execute the wear leveling operation or not (S1040). That is, whether to execute the wear leveling operation may not be considered at the operation S1040.

Figure 11:
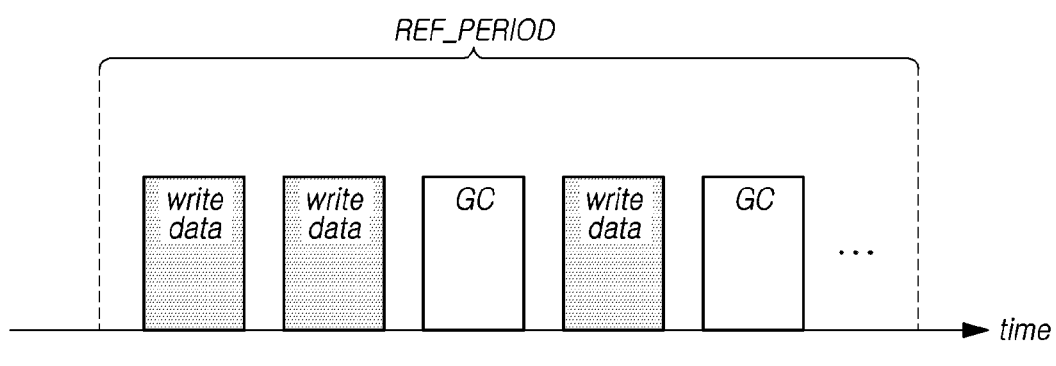
FIG. 11 is a diagram illustrating another example of performance information of a storage device according to an embodiment of the disclosure.

FIG. 11 is a diagram illustrating another example of performance information of a storage device according to an embodiment of the disclosure.

Referring to FIG. 11, a performance information may include 1) a size E of data requested to be written from the outside of the storage device 100 during a set reference time period REF_PERIOD, and 2) a size F of free space increased through a garbage collection operation during the reference time period REF_PERIOD.

When the size E is greater than the size F, the size of the free space included in the memory 110 gradually decreases. Therefore, a controller 120 may adjust the size E and the size F so that they are as similar as possible by executing a garbage collection operation to secure free space included in a memory 110.

On the other hand, when the size E is less than the size F, the size of the free space included in the memory 110 gradually increases. Therefore, the controller 120 may adjust the size E and the size F to be as similar as possible by delaying the execution of the garbage collection operation.

Figure 12:
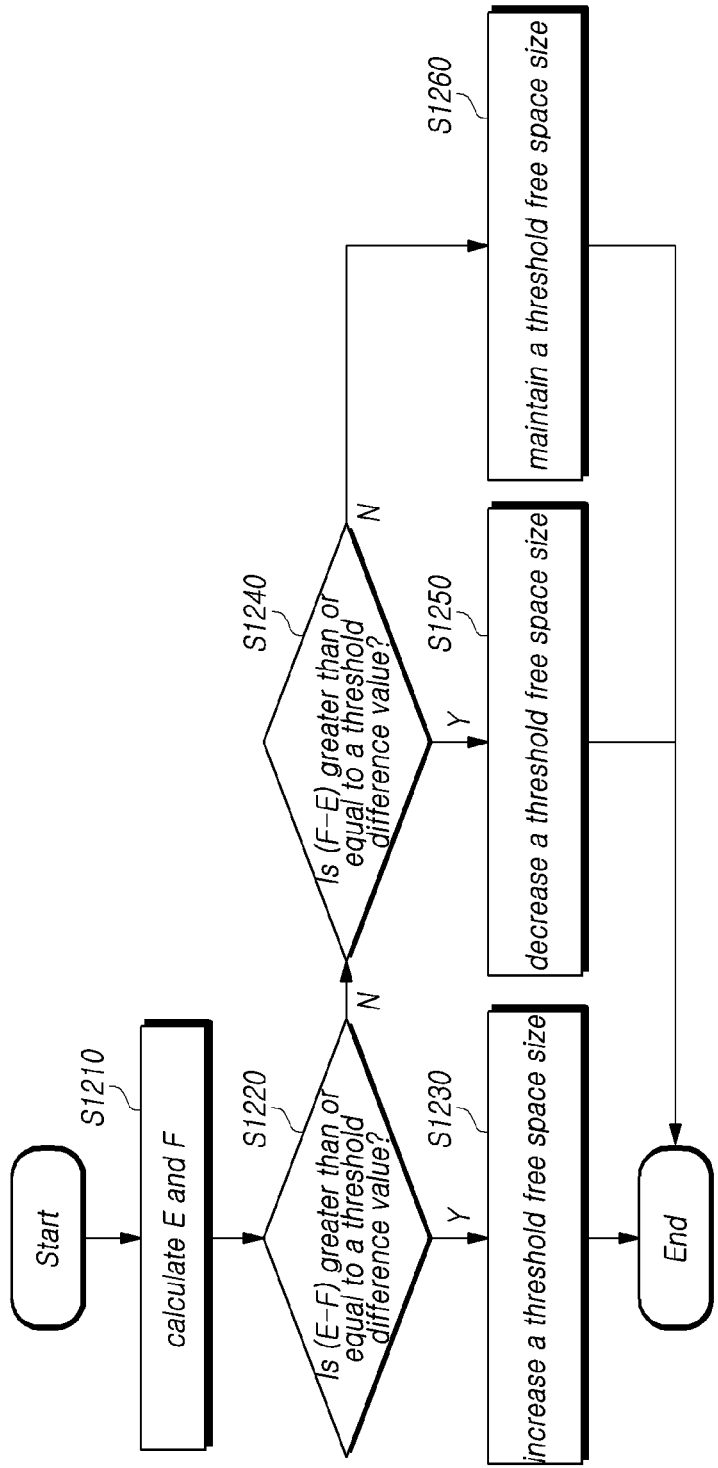
FIG. 12 is a flowchart illustrating an operation of a storage device in connection with performance information described in FIG. 11 according to an embodiment of the disclosure.

FIG. 12 is a flowchart illustrating an operation of a storage device in connection with performance information described in FIG. 11 according to an embodiment of the disclosure.

Referring to FIG. 12, a controller 120 of a storage device 100 may calculate a size E and a size F (S1210).

The controller 120 determines whether the difference between size E and size F (i.e., E-F) is greater than or equal to a set threshold difference value (S1220). That is, the controller determines whether the size E is greater than the size F by the threshold difference value or more.

When the difference (E-F) is greater than or equal to the threshold difference value (S1220—Y), the controller 120 may increase the threshold free space size (S1230). As described in FIG. 8, this means that garbage collection operation is executed faster.

On the other hand, when the (E-F) is less than the threshold difference value (S1220—N), the controller 120 may increase the threshold difference value (S1240).

When the difference between size F and size E (i.e. F-E) is greater than or equal to the threshold difference value (S1240—Y), the controller 120 may decrease the threshold free space size (S1250). As described above with reference to FIG. 8, this means that garbage collection operations may be delayed.

On the other hand, when the difference between size F and size E (F-E) is less than or equal to the threshold difference value (S1240—N), the controller 120 may maintain the threshold free space size (S1260).

Figure 13:
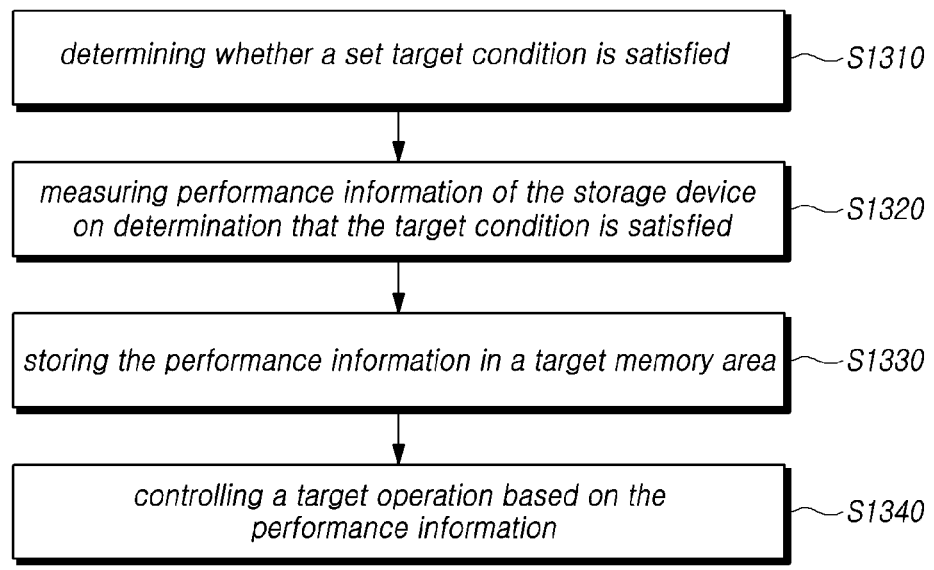
FIG. 13 is a diagram illustrating a method for operating a storage device according to an embodiment of the disclosure.

FIG. 13 is a diagram illustrating a method for operating a storage device according to an embodiment of the disclosure.

Referring to FIG. 13, a method for operating a storage device 100 may include determining whether a set target condition is satisfied (S1310).

The method for operating the storage device 100 may include measuring performance information PER_INFO of the storage device 100 on determination that the target condition is satisfied (S1320).

The method for operating the storage device 100 may include storing the performance information PER_INFO in a target memory area TGT_MEM_AREA (S1330). The target memory area TGT_MEM_AREA may include one or more of a plurality of memory blocks BLK in a memory 110.

The method for operating the storage device 100 may include controlling a target operation based on the stored performance information PER_INFO (S1340).

For example, the performance information PER_INFO may include i) size A of data written, during a set reference time period, in a first memory area MEM_AREA_1 including one or more first type memory blocks BLK_TYPE_1 from among the plurality of memory blocks BLK, and ii) size B of data written, due to a failure to write to the first memory area MEM_AREA_1 during the reference time period, in a second memory area MEM_AREA_2 including one or more second type memory blocks BLK_TYPE_2 from among the plurality of memory blocks. The first type memory blocks BLK_TYPE_1 may operate at a higher speed than the second type memory blocks BLK_TYPE_2.

The target operation may be an operation of storing write-requested data from the outside of the storage device 100 in the memory 110. The operation S1340 may increase the size of the first memory area MEM_AREA_1 by a set reference size when the ratio of B to A is greater than or equal to a threshold ratio.

As another example, the performance information PER_INFO may include total size C of invalid data stored in the memory 110 at the time when the size of the free space included in the memory 110 is changed.

In this case, the target operation may be a garbage collection operation. The operation S1340 may include determining a threshold free space size based on the size C and executing a garbage collection operation when the size of free space included in the memory 110 is less than the threshold free space size.

The determining the threshold free space size based on the size C may increase the threshold free space size when the size C is greater than or equal to a set first threshold invalid data size, and decrease the threshold free space size when the size C is less than a set second threshold invalid data size. In an example, the first threshold invalid data size is greater than the second threshold invalid data size.

As another example, the performance information PER_INFO may include size D of invalidated data among data migrated by garbage collection operations during a set reference time period.

In this case, the target operation may be a wear leveling operation. The operation S1340 may further determine whether to execute a wear leveling operation when the size D is greater than or equal to a threshold data size.

As another example, the performance information PER_INFO may include size E of data requested to be written from the outside of the storage device 100 during a set reference time period and size F of free space increased through a garbage collection operation during the reference time period.

In this case, the target operation may be a garbage collection operation. The operation S1340 may include determining a threshold free space size based on the size E and size F, and executing a garbage collection operation when the size of the free space included in the memory 110 is less than a threshold free space size. In an example, the determining the threshold free space size based on the size E and the size F may increase the threshold free space size when the size E is greater than the size F by a set threshold difference value or more, and decrease the threshold free space size when the size F is greater than the size E by the threshold difference value or more.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A storage device comprising:
   a memory including a plurality of memory blocks; and
   a controller configured to:
   store performance information of the storage device in a target memory area including one or more of the plurality of memory blocks on determination that a target condition is satisfied; and
   control a target operation based on the stored performance information,
   wherein the performance information includes a size A of data written, during a reference time period, in a first memory area including one or more first type memory blocks from among the plurality of memory blocks, and a size B of data written, due to a failure to write to the first memory area during the reference time period, in a second memory area including one or more second type memory blocks from among the plurality of memory blocks, and
   wherein the first type memory blocks operate at a higher speed than the second type memory blocks.

2. The storage device according to claim 1,
   wherein the target condition is satisfied when a cumulative size of write-requested data from outside of the storage device, after the reference time period, is a multiple of a unit size.

3. The storage device according to claim 1,
   wherein the target operation is an operation of storing write-requested data from outside of the storage device in the memory; and
   wherein the controller is configured to increase a size of the first memory area by a reference size when a ratio of B to A is greater than or equal to a threshold ratio.

4. The storage device according to claim 3,
   wherein the controller is configured to decrease the size of the first memory area by the reference size after all data stored in the first memory area is flushed to the second type memory blocks from among the plurality of memory blocks.

5. The storage device according to claim 1,
wherein the performance information includes a size C of invalid data stored in the memory at a time when a size of a free space included in the memory is changed.

6. The storage device according to claim 5,
wherein the target operation is a garbage collection operation, and
wherein the controller is configured to:
execute the garbage collection operation when the size of the free space included in the memory is less than a threshold free space size,
increase the threshold free space size when the size C is greater than or equal to a first threshold invalid data size, and
decrease the threshold free space size when the size C is less than a second threshold invalid data size; and
wherein the first threshold invalid data size is greater than the second threshold invalid data size.

7. The storage device according to claim 1,
wherein the performance information includes a size D of invalidated data among data migrated by a garbage collection operation during the reference time period.

8. The storage device according to claim 7,
wherein the target operation is a wear leveling operation, and
wherein the controller is configured to further determine whether to execute the wear leveling operation when the size D is greater than or equal to a threshold data size.

9. The storage device according to claim 1,
wherein the performance information includes a size E of data requested to be written from outside of the storage device during the reference time period and a size F of a free space increased through a garbage collection operation during the reference time period.

10. The storage device according to claim 9,
wherein the target operation is the garbage collection operation, and
wherein the controller is configured to:
execute the garbage collection operation when a size of the free space included in the memory is less than a threshold free space size,
increase the threshold free space size when the size E is greater than the size F by a threshold difference value or more, and
decrease the threshold free space size when the size F is greater than the size E by a threshold difference value or more.

11. A method for operating a storage device, comprising:
determining a target condition is satisfied;
measuring performance information of the storage device on determination that the target condition is satisfied;
storing the performance information in a target memory area including one or more of a plurality of memory blocks in a memory; and
controlling a target operation based on the stored performance information,
wherein the performance information includes a size A of data written, during a reference time period, in a first memory area including one or more first type memory blocks from among the plurality of memory blocks, and a size B of data written, due to a failure to write to the first memory area during the reference time period, in a second memory area including one or more second type memory blocks from among the plurality of memory blocks, and
wherein the first type memory blocks operate at a higher speed than the second type memory blocks.

12. The method according to claim 11,
wherein the target operation is an operation of storing write-requested data from outside of the storage device in the memory; and
wherein the controlling the target operation increases a size of the first memory area by a reference size when a ratio of B to A is greater than or equal to a threshold ratio.

13. The method according to claim 11,
wherein the performance information includes a size C of invalid data stored in the memory at a time when a size of a free space included in the memory is changed.

14. The method according to claim 13,
wherein the target operation is a garbage collection operation, and
wherein the controlling the target operation includes determining a threshold free space size based on the size C; and
executing the garbage collection operation when the size of the free space included in the memory is less than the threshold free space size; and
wherein the determining the threshold free space size based on the size C increases the threshold free space size when the size C is greater than or equal to a first threshold invalid data size, and decreases the threshold free space size when the size C is less than a second threshold invalid data size; and
wherein the first threshold invalid data size is greater than the second threshold invalid data size.

15. The method according to claim 11,
wherein the performance information includes a size D of invalidated data among data migrated by a garbage collection operation during the reference time period.

16. The method according to claim 15,
wherein the target operation is a wear leveling operation, and
wherein the controlling the target operation further determines whether to execute the wear leveling operation when the size D is greater than or equal to a threshold data size.

17. The method according to claim 11,
wherein the performance information includes a size E of data requested to be written from outside of the storage device during the reference time period and a size F of a free space increased through a garbage collection operation during the reference time period.

18. The method according to claim 17,
wherein the target operation is the garbage collection operation, and
wherein the controlling the target operation includes determining a threshold free space size based on the size E and the size F; and
executing the garbage collection operation when a size of the free space included in the memory is less than the threshold free space size; and
wherein the determining the threshold free space size based on the size E and the size F increases the threshold free space size when the size E is greater than the size F by a threshold difference value or more, and decreases the threshold free space size when the size F is greater than the size E by a threshold difference value or more.

* * * * *